Dec. 10, 1968  G. B. KARNOFSKY  3,415,872
METHOD OF MANUFACTURING VINYL ACETATE MONOMER
Filed Nov. 19, 1962
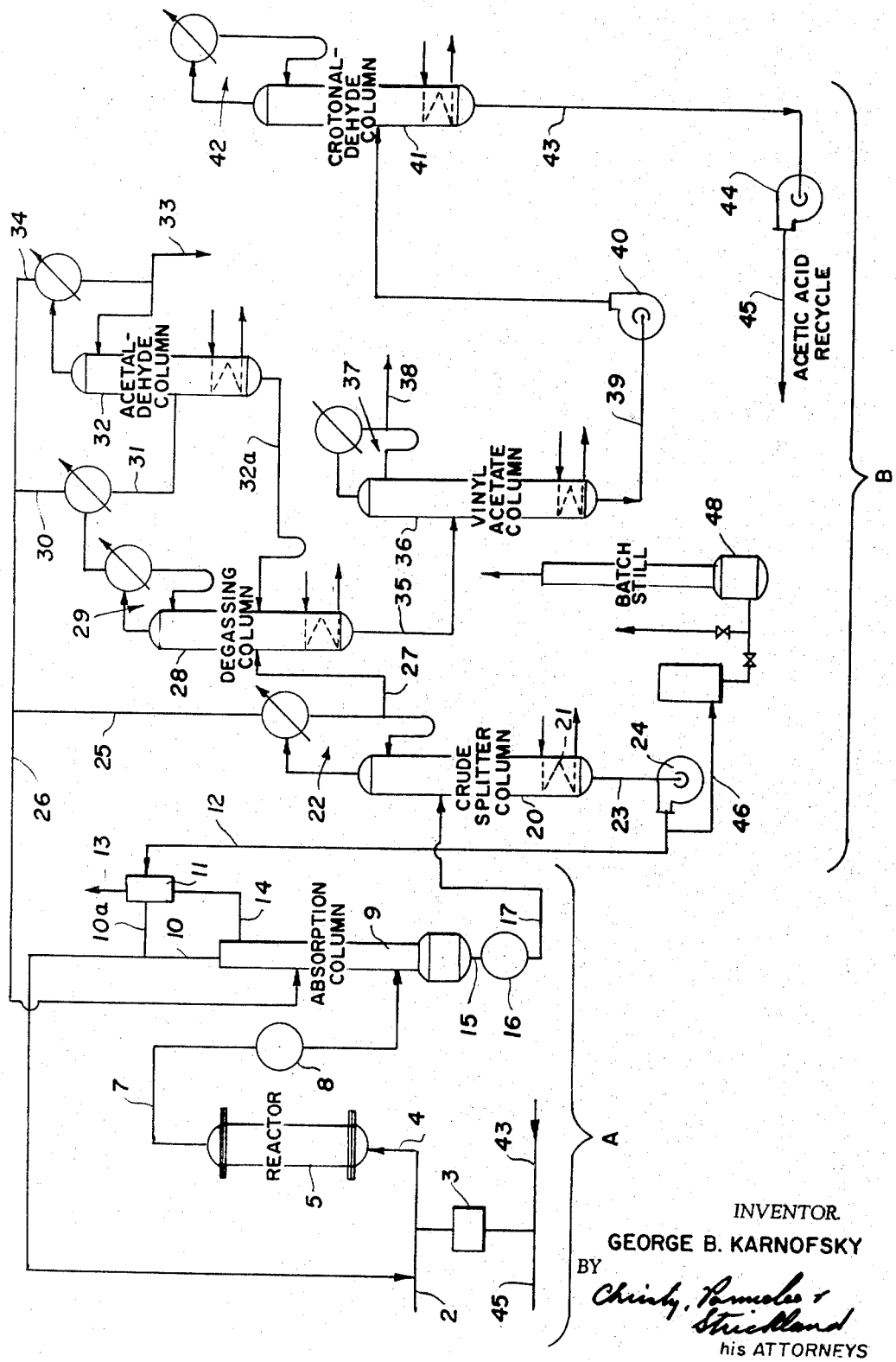
INVENTOR.
GEORGE B. KARNOFSKY
BY
his ATTORNEYS

United States Patent Office 3,415,872
Patented Dec. 10, 1968

3,415,872
METHOD OF MANUFACTURING VINYL ACETATE MONOMER
George B. Karnofsky, Pittsburgh, Pa., assignor to Blaw-Knox Company, Pittsburgh, Pa., a corporation of Delaware
Filed Nov. 19, 1962, Ser. No. 238,525
6 Claims (Cl. 260—498)

This invention relates to the manufacture of vinyl acetate monomer, and relates particularly to the treatment of the crude reaction products after they have been condensed in the conventional process by refrigeration, or by absorption into acetic acid as disclosed in my copending application Ser. No. 238,514, filed Nov. 19, 1962, now Patent No. 3,172,733.

Vinyl acetate is manufactured by reacting acetylene and glacial acetic acid vapor in a closed environment containing a catalyst. Substantial amounts of acetylene and acetic acid are not reacted, and must be recovered for recycling to the reactor while the vinyl acetate monomer must be separated without being so recycled. Also, certain side reaction compounds result, some of which, if recycled to the reactor, would poison or reduce the efficiency of the catalyst, or dilute the acetylene and acetic acid vapor to an undesirable extent. Uncondensable gases are also present, and these must be vented at a rate comparable to their addition.

The principal side reaction products are ethylidene diacetate and acetic anhydride, which are characterized as the heavy ends, and acetaldehyde and crotonaldehyde are the lighter ends. Crotonaldehyde is particularly detrimental to the catalyst if it is recycled to the reactor.

It has heretofore been considered necessary to provide a separate distillation column for the final rectification of the acetic acid before it can be recycled to the reactor. With the present invention, the crude reaction products are introduced initially into a column which I designate a "crude splitter column." Enough acetic acid is removed from the top of this column to carry with it all or substantially all of the crotonaldehyde along with the vinyl acetate and acetaldehyde. The bottoms consist of acetic acid in which is dissolved the heavier end products, acetic anhydride and ethylidene diacetate. Also there will be unreacted acetylene removed from the top of the crude splitter.

In this respect the crude splitter corresponds to the operation of the column designated by the same name in my copending application. From the crude splitter the condensed overhead enters a degassing column. Product overhead from this column is passed into an acetaldehyde column where acetaldehyde is removed as overhead while the bottoms of the acetaldehyde column are returned to the degassing column.

Bottoms from the degassing column enter a vinyl acetate column where vinyl acetate is distilled as overhead, while the bottoms comprising acetic acid and crotonaldehyde and any other compounds intermediate in volatility between vinyl acetate and crotonaldehyde flow to a crotonaldehyde column, where crontonaldehyde and such other compounds are removed as overhead and acetic acid leaves this column as bottoms to be recycled to the reactor. Thus the acetic acid is rectified without a distillation column where the rectified acetic acid leaves the still as overhead from the column.

This procedure simplifies the apparatus and piping and reduces initial plant cost and operating expense. Bottoms removed from the crude splitter containing the acetic anhydride and ethylidene diacetate are desirably used as the absorbent in the process of my copending application, but with conventional processes of condensing the crude reaction products there is no similar use of the crude splitter bottoms. In either case, however, a draw is provided through which some of these bottoms may be taken to a batch still for recovery of acetic acid. In common with my copending application this method has the advantage of immediately separating the ethylidene diacetate from the vinyl acetate, and this is important to insure purity of the vinyl acetate, because of the slow decomposition of ethylidene diacetate under heat into acetaldehyde and acetic anhydride.

In the accompanying drawing, the view is a schematic diagram of an apparatus for the practice of my invention.

For completeness of disclosure I have shown an apparatus wherein the crude products of the reactor enter an absorption column where they are absorbed, as in my said copending application, but the invention is also applicable to a conventional system in which the crude reactor products are condensed by refrigeration, as in Stanton Patent No. 2,794,827. To make this clear, that portion of the apparatus embraced in bracket A is identical to this disclosure, but shows one source from whence crude reactor products are derived, while the present invention is comprehended in the section bracketed as B.

In the drawing, 2 is a pipe for supplying acetylene gas and 3 is a vaporizer for glacial acetic acid. The acetylene and acid vapor are carried through a duct 4 to a reactor 5 containing a catalyst. Crude products from the reactor flow through pipe 7 and with the absorber system of my application through a cooler 8 into an absorption column 9. At the top of this column is a pipe 10 through which unreacted acetylene gas is carried back to pipe 2. A side stream of gas flows through pipe 10a into a scrubber 11 which is supplied with acetic acid through pipe 12. Acetylene is absorbed from the side stream of gases in the scrubber, while uncondensable gases escape through vent 13.

Acetic acid from the scrubber flows through pipe 14 into the absorber where it contacts the crude reactor products. At the bottom of the absorber is an outlet 15 leading to a storage vessel 16.

From this storage vessel in this instance the reaction products with the absorbent, or in a condensing system, the crude reaction products, flow through pipe 17 into the B section. The first unit in the B section is a distillation column 20 of conventional construction which I designate as a "crude splitter column" having a heater 21 at the bottom, and a condensing and refluxing means 22 at the top. There is an outlet pipe 23 at the bottom leading to a pump 24.

Acetylene gas from the crude splitter distillation column is led off through pipe 25 to pipe 26. In the particular installation here shown, pipe 26 returns acetylene from this still to the absorber column, but with a condensing system it would be returned to the crude condenser, as is well understand in the art.

Overhead from the crude splitter comprising acetic acid, vinyl acetate, crotonaldehyde, and acetaldehyde flows through pipe 27 to a degassing column 2. This is also a conventional distillation column with heating means as indicated at the bottom and a condensing refluxing system 29 at the top. Acetylene from this column is lead through pipe 30 to pipe 26.

Overhead from this column 28 passes through pipe 31 into a distillation column 32, also of conventional construction, where acetaldehyde is removed as overhead and carried away in waste pipe 33. Acetylene released in this column is carried though pipe 34 to pipe 26. Bottoms from the acetaldehyde column are returned through pipe 32a to the degassing column 28 intermediate the top and bottom.

Bottoms from the degassing column are transferred through pipe 35 to an intermediate level in distillation column 36, which is the vinyl acetate column. This is also a conventional distillation column with a heater as indicated at the bottom and a condensing-refluxing means 37 at the top. The vinyl acetate monomer is separated out in this column and carried to storage as overhead through pipe 38.

The bottoms from this column now comprise acetic acid carrying crotonaldehyde are passed through pipe 39, which include pump 40 to the end column 41 which is a conventional column with a heater at the bottom and a condensing-reflux means 42 at the top. Here the crotonaldehyde is stripped from the acetic acid as overhead and the acetic acid is removed as bottom product through pipe 43 with pump 44 to be returned to acetic acid vaporizer 3 along with make-up acid supplied through pipe 45.

The bottoms from the crude splitter column that are removed through pipe 23 and pump 24 comprise acetic acid and the heavy ends, that is ethylidene diacetate and acetic anhydride. Where an absorber system as here shown is used to absorb the crude reactor products these bottoms, as explained in my copending application, provide a desirable absorbent for circulation to the scrubber and absorber, and such a system is here shown. However, since the continuous recirculation of these bottoms would build up an accumulation of heavy ends, a draw 46 for intermittently or continuously removing a limited volume of the bottoms is provided. In the case where the conventional refrigerated condenser method is used for the reactor products, a continuous but controlled draw would be made through pipe 46, and pipe 12 leading to the scrubber would not be provided. In either case the material drawn off would be accumulated for recovery of acetic acid in a batch still 48.

From the foregoing description the operation of the apparatus and the method are apparent. Through the process of initially splitting or dividing the crude reactor products into two streams, one carrying acetic acid with the heavy ends and no more than a trace of crotonaldehyde, and one carrying the acetic acid and vinyl acetate and the lighter ends, the acetaldehyde may be first removed, then the vinyl acetate monomer, leaving the remaining lighter ends for removal as overhead from the acetic acid which is recovered as still bottoms, avoiding the need for a separate rectifying column for the acetic acid.

It will be understood that the drawing is schematic showing the general arrangement of conventional apparatus for effecting the method, and that those skilled in the art may supply the usual accessor equipment and controls that form no part of the instant invention. Where "crotonaldehyde" appears in the following claims, it shall be understood to mean crotonaldehyde and all other reaction products of volatility between vinyl acetate and acetic acid. Similarly, "acetaldehyde" as used in the following claims means acetaldehyde and all other reaction products such as acetone whose volatilities are intermediate between acetylene and vinyl acetate monomer.

I claim as my invention:

1. In the process of manufacturing vinyl acetate monomer from the reaction of acetylene and acetic acid in a reactor where vinyl acetate, unreacted acetic acid and acetylene comprise the major products from the reaction and crotonaldehyde, acetic anhydride and ethylidene diacetate comprise minor reaction products and wherein unreacted acetic acid is rectified for re-use, the steps of effecting the separation of the acetic acid and vinyl acetate free of crotonaldehyde and other side reaction products comprising initially separating the crude products by distillation in a distillation column into acetic acid, vinyl acetate and crotonaldehyde as overhead product, and acetic acid with minor reaction products less volatile than acetic acid as still bottoms, distilling the overhead from the first distillation in another distillation column to recover vinyl acetate as overhead and acetic acid with crotonaldehyde as bottoms, distilling said last-named bottoms in a third last column to remove the crotonaldehyde as overhead and rectified acetic acid as bottoms, and recycling said acetic acid so obtained as bottoms to the reactor.

2. In the method of manufacturing vinyl acetate monomer as defined in claim 1 in which the crude reaction products also contain acetaldehyde in which the acetaldehyde is distilled from the overhead of the first distillation column before the vinyl acetate is stripped therefrom.

3. In the method of manufacturing vinyl acetate monomer as defined in claim 1, the further step of drawing bottoms from the first distillation column to preclude the accumulation of heavy end side products and subsequently recovering acetic acid therefrom.

4. In the manufacture of vinyl acetate monomer by the reaction of acetylene and glacial acetic acid in a reactor, and recovering rectified acetic acid from the reaction products for re-use, the steps of first separating the crude reaction products by distillation into two streams, the first comprising vinyl acetate and unreacted acetic acid and the more volatile side reaction products, the second comprising acetic acid with the less volatile side reaction products, separately and successively distilling from the first stream acetaldehyde, vinyl acetate, and then other side reaction products intermediate in volatility between vinyl acetate and acetic acid and in the same step recovering substantially pure unreacted acetic acid as still bottoms, and recycling said unreacted acetic acid so recovered to the reactor.

5. In the manufacture of vinyl acetate monomer by the reaction of glacial acetic acid and acetylene in a reactor wherein the crude products from the reactor comprise unreacted acetylene, unreacted acetic acid, vinyl acetate monomer, light side reaction products comprising crotonaldehyde, and acetaldehyde and heavy side reaction products comprising acetic anhydride and ethylidene diacetate and recovering rectified acetic acid for re-use which comprises separating the crude reaction products in a first distillation column into overhead comprising vinyl acetate monomer and acetic acid and the lighter side reaction products and bottoms comprising acetic acid with the heavier side reaction products, separately distilling from the overhead of said first column acetaldehyde and vinyl acetate monomer and separating out as still bottoms acetic acid with the remaining lighter side reaction products, and then subjecting said last-named still bottoms to distillation in a succeeding column to remove crotonaldehyde as overhead and to recover substantially pure acetic acid as bottoms, and recycling the said recovered acetic acid to the reactor.

6. In the method of making vinyl acetate by the reaction of acetylene and acetic acid vapor wherein the crude reactor products comprise vinyl acetate, unreacted acetylene, unreacted acetic acid, light end products, crotonaldehyde as an intermediate product having a boiling point between that of vinyl acetate and acetic acid and heavy end product comprising ethylidene diacetate and wherein the crude reactor products are reduced to a liquid phase and a gaseous phase with ethylidene diacetate and crotonaldehyde in the liquid phase and wherein successive fractional distillation is effected to recover vinyl acetate monomer and substantially pure acetic acid, the step which comprises introducing the liquid phase reactor products into a crude splitter column and first separating out ethylidene diacetate and some acetic acid as bottom product and removing vinyl acetate, acetic acid, crotonaldehyde and light end products as overhead, and thereafter fractionating the overhead to separate out vinyl acetate and acetic acid substantially free of the light end products and crotonaldehyde.

References Cited

UNITED STATES PATENTS 2,794,827  6/1957  Stanton _____ 260—498

LORRAINE A. WEINBERGER, *Primary Examiner.*

V. GARNER, *Assistant Examiner.*

U.S. Cl. XR

260—604, 533, 499